(12) United States Patent
Litz et al.

(10) Patent No.: US 8,840,020 B2
(45) Date of Patent: Sep. 23, 2014

(54) BIOMETRIC TERMINALS

(75) Inventors: Alexander A. Litz, Albuquerque, NM (US); Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 0 days.

(21) Appl. No.: 13/303,703

(22) Filed: Nov. 23, 2011

(65) Prior Publication Data
US 2012/0138680 A1 Jun. 7, 2012

Related U.S. Application Data

(60) Provisional application No. 61/418,682, filed on Dec. 1, 2010.

(51) Int. Cl.
*G06K 7/01* (2006.01)
*G07C 9/00* (2006.01)

(52) U.S. Cl.
CPC .................................. *G07C 9/00158* (2013.01)
USPC .... 235/382.5; 235/375; 235/382; 235/462.13

(58) Field of Classification Search
USPC ................. 235/375, 382, 382.5, 380, 462.15, 235/462.13, 454, 462.01, 462.04, 462.09
See application file for complete search history.

(56) References Cited

U.S. PATENT DOCUMENTS

| | | | | |
|---|---|---|---|---|
| 5,995,014 A | * | 11/1999 | DiMaria | 340/5.52 |
| 6,560,352 B2 | * | 5/2003 | Rowe et al. | 382/115 |
| 7,706,778 B2 | * | 4/2010 | Lowe | 455/411 |
| 8,150,374 B2 | * | 4/2012 | Lowe | 455/411 |
| 8,629,755 B2 | * | 1/2014 | Hashim-Waris | 340/5.52 |
| 2002/0063154 A1 | | 5/2002 | Hoyos et al. | |
| 2003/0063772 A1 | * | 4/2003 | Smith et al. | 382/100 |
| 2003/0133143 A1 | * | 7/2003 | McClurg et al. | 358/1.14 |
| 2005/0265585 A1 | * | 12/2005 | Rowe | 382/124 |
| 2005/0270140 A1 | * | 12/2005 | Oh | 340/5.83 |
| 2006/0224901 A1 | * | 10/2006 | Lowe | 713/186 |
| 2006/0244947 A1 | * | 11/2006 | Rowe | 356/71 |
| 2007/0288998 A1 | * | 12/2007 | Gudigara et al. | 726/5 |
| 2008/0022089 A1 | * | 1/2008 | Leedom | 713/156 |
| 2008/0059372 A1 | | 3/2008 | Lee et al. | |
| 2008/0148059 A1 | * | 6/2008 | Shapiro | 713/186 |
| 2008/0237331 A1 | | 10/2008 | Hammer | |
| 2009/0097720 A1 | * | 4/2009 | Roy et al. | 382/124 |
| 2009/0117875 A1 | | 5/2009 | Weigele et al. | |
| 2009/0165125 A1 | * | 6/2009 | Brown et al. | 726/21 |
| 2009/0183008 A1 | * | 7/2009 | Jobmann | 713/186 |
| 2010/0077466 A1 | * | 3/2010 | Lowe | 726/6 |
| 2010/0138344 A1 | * | 6/2010 | Wong et al. | 705/44 |
| 2010/0259549 A1 | * | 10/2010 | Brown et al. | 345/589 |

* cited by examiner

*Primary Examiner* — Paultep Savusdiphol
(74) *Attorney, Agent, or Firm* — Marsh Fischmann & Breyfogle LLP; Daniel J. Sherwinter

(57) ABSTRACT

Biometric terminals are disclosed that include a biometric reader, an input device, and a processor coupled with the biometric reader and the input device. The processor has instructions to read a biometric measure from a user with the biometric reader. It also has instructions to receive an encoded signal from a handheld device with the input device, the encoded signal including an instruction to update a biometric access system. Instructions are included to decode the encoded signal and to modify biometric access by the user to the biometric access system in accordance with the instruction to update the biometric access system. Update of the biometric access system is acknowledged.

29 Claims, 13 Drawing Sheets

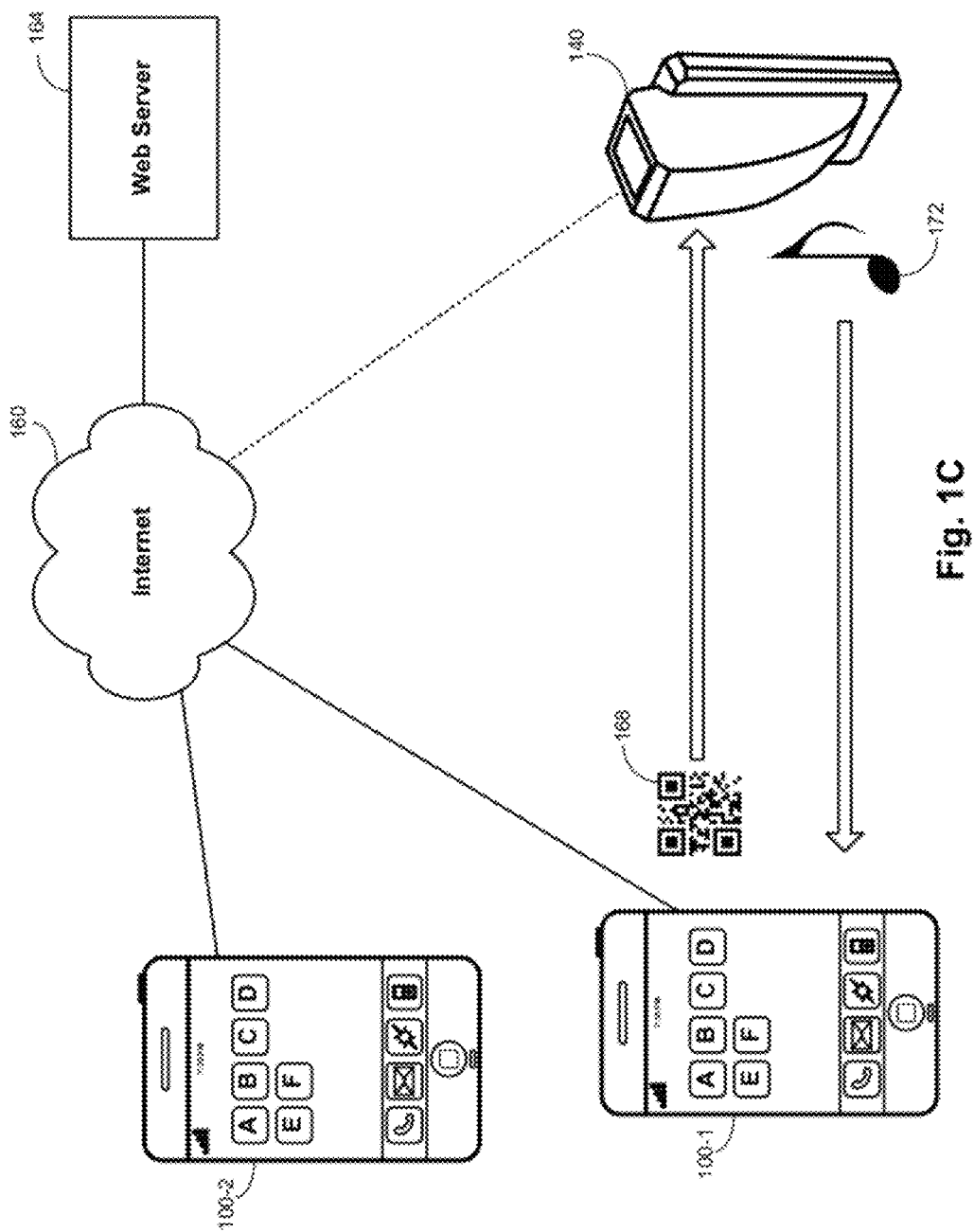

BIOMETRIC TERMINALS

CROSS-REFERENCES TO RELATED APPLICATIONS

This application is a nonprovisional of, and claims the benefit of the filing date of, U.S. Prov. Pat. Appl. No. 61/418,682, entitled "BIOMETRIC TERMINALS," filed Dec. 1, 2010 by Alexander A. Litz and Robert K. Rowe, the entire disclosure of which is incorporated herein by reference for all purposes.

This application is related to concurrently filed, commonly assigned, U.S. patent application Ser. No. 13/303,619, entitled "UPDATES OF BIOMETRIC ACCESS SYSTEMS", which is a nonprovisional of U.S. Prov. Pat. Appl. No. 61/418,672, entitled "UPDATES OF BIOMETRIC ACCESS SYSTEMS," filed Dec. 1, 2010 by Alexander A. Litz and Robert K. Rowe, both of which are incorporated herein by reference for all purposes.

This application is also related to U.S. patent application Ser. No. 13/303,656, entitled "DATA TRANSMISSION TO OPTICAL TERMINALS"), which is a nonprovisional of U.S. Prov. Pat. Appl. No. 61/418,676, entitled "DATA TRANSMISSION TO OPTICAL TERMINALS," filed Dec. 1, 2010 by Alexander A. Litz and Robert K. Rowe, both of which are incorporated herein by reference for all purposes.

BACKGROUND OF THE INVENTION

This application relates generally to methods and systems for access management. More specifically, this application relates to methods and systems for managing enrollment and authorization levels in access systems. There are innumerable applications in which access needs to be managed, whether it be access to physical locations, access to system functionality, or other types of access. For example, physical-access applications include a variety of security functions in which the ability of an individual to access a building, room, parking facility, and the like is to be limited to authorized persons. Related to such physical-access applications are timekeeper functions in which the access of a particular individual to a physical location is monitored. This may include functionality in which only authorized individuals are permitted access, but there may also be implementations in which security for the physical location is less important than monitoring the time that certain individuals are present in the location. For instance, in employment settings, the actual time that an employee spends in a certain location may be monitored so that compliance with employment conditions may be verified.

Examples of system-functionality access may include access limitations to individual devices rather than to physical locations. Examples include limiting access to certain functionality for computers or machinery to those who have a certain access level. For instance, in a retail environment, it may be desirable to provide a supervisor with greater access to functions of a cash device than is afforded to clerks, even where the supervisor and clerks have exactly the same physical access.

There have been many different ways in which access limitations have been provided in the past. Common approaches include the issuance of physical keys to authorized personnel as well as the use of passwords intended to be known only by those having sufficient authority. Such mechanisms have well-known limitations in that keys can be copied, and keys and passwords are readily capable of being shared with others. In recent years, biometric systems have been developed and increasingly deployed to address some of these concerns. But even biometric systems require management that can be costly and time-consuming.

SUMMARY

Embodiments of the invention provide biometric terminals that include a biometric reader, an input device, and a processor coupled with the biometric reader and the input device. The processor has instructions to read a biometric measure from a user with the biometric reader. It also has instructions to receive an encoded signal from a handheld device with the input device, the encoded signal including an instruction to update a biometric access system. Instructions are included to decode the encoded signal and to modify biometric access by the user to the biometric access system in accordance with the instruction to update the biometric access system. Updating of the biometric access system is acknowledged.

The biometric terminal may accommodate a number of different types of updates, include enrollment of the user into the biometric access system, deletion of authorization for the user from the biometric access system, changing an access level for the user within the biometric access system, and changing a service level with the biometric access system.

In specific embodiments, the input device consists of an optical reader. Language asserting that the input device "consists of" an optical reader is intended to mean that the biometric terminal lacks other direct mechanisms of input than the optical reader. In these embodiments, the encoded signal comprises an image displayed on a display of the handheld device and readable by the optical reader.

The image may have a size that is periodically modulated on the display while maintaining internal relative dimensions within the image. Furthermore, the image may change over time, with the instructions to receive the encoded signal comprising instructions to read a plurality of images from the display. One example of an image that may be used is a barcode, which may comprise a two-dimensional barcode or a color barcode in some embodiments.

The biometric terminal may also comprise a signal generator in communication with the processor, with the instructions to acknowledge comprising instructions to generate an acknowledgment signal with the signal generator to the handheld device after the biometric access system has been updated. The signal generator may comprise an acoustic signal generator.

The biometric reader may generally comprise an optical biometric reader configured to image a skin site of the user. For example, in such an embodiment, the optical biometric reader may comprise an illumination source disposed to provide light to illuminate the skin site and an imaging system disposed to receive light scattered from the skin site. The optical biometric reader may also comprise objects to generate multispectral images detected by the imaging system.

In another set of embodiments, a biometric terminal comprises an input device that consists of an optical reader, a signal generator, and a processor coupled with the optical reader and the signal generator. The processor has instructions to read a biometric measure from a skin site of a user with the optical reader, to receive an encoded signal from a handheld device with the optical reader, instructions to decode the encoded signal, and instructions to transmit an acknowledgment signal with the signal generator to the handheld device after the encoded signal has been decoded. The encoded signal comprises an image displayed on a display of the handheld device.

This set of embodiments may include variations similar to those described above, namely in accommodating different types of images and in accommodating different types of optical readers.

BRIEF DESCRIPTION OF THE DRAWINGS

A further understanding of the nature and advantages of the present invention may be realized by reference to the remaining portions of the specification and the drawings, wherein like reference labels are used through the several drawings to refer to similar components. In some instances, reference labels are followed with a hyphenated sublabel; reference to only the primary portion of the label is intended to refer collectively to all reference labels that have the same primary label but different sublabels.

FIG. 1C is a schematic illustration of communication paths that may be used in implementing embodiments of the invention;

DETAILED DESCRIPTION OF EXEMPLARY EMBODIMENTS

Embodiments of the invention provide methods and systems that allow for effective management of access systems. In some embodiments, such access systems include biometric access systems, with "biometrics" referring generally to the statistical analysis of characteristics of living bodies. In those embodiments, biometrics may be used to identify and/or verify the identity of individuals authorized to have access.

Overview

Figure 1B:
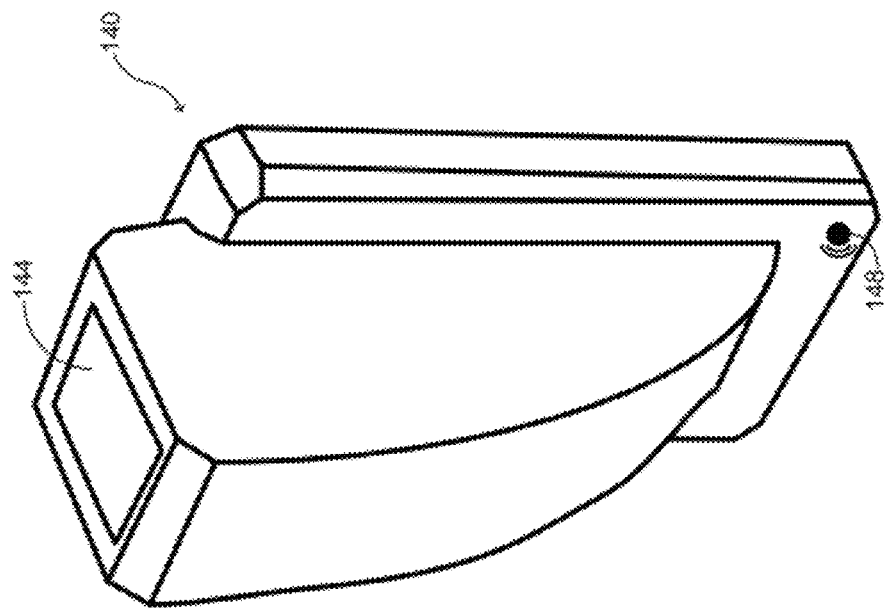
FIG. 1B provides an illustration of a physical structure for an optical terminal that may be used in embodiments of the invention.
Figure 1A:
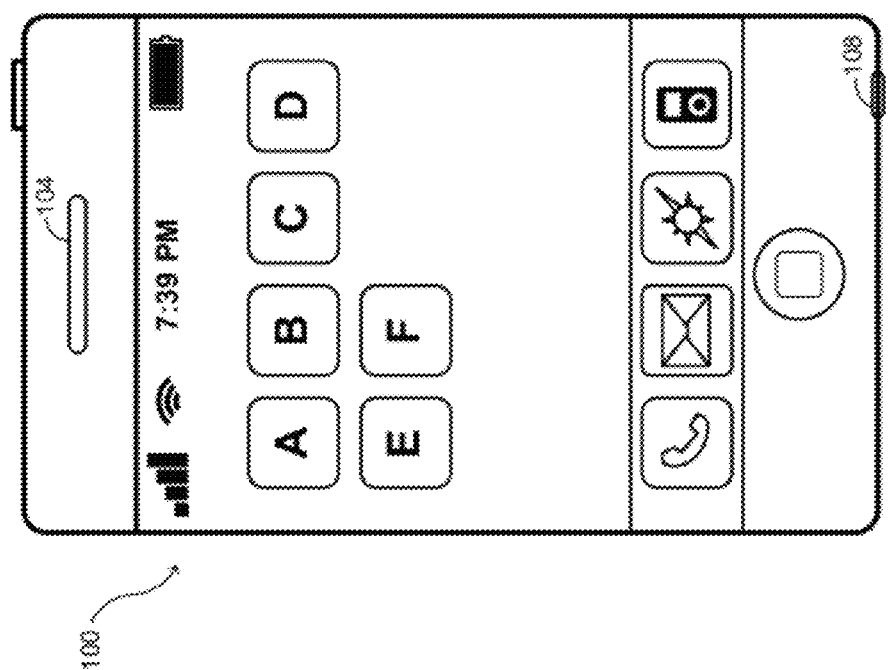
FIG. 1A provides an illustration of a handheld device of the type that may be used in embodiments of the invention.

Embodiments of the invention make use of a handheld electronic device and a terminal as illustrated respectively in FIGS. 1A and 1B. The structure shown for the handheld device 100 in FIG. 1A is merely exemplary; the invention may make use of any type of handheld electronic device that allows display of information to a user and allows a user to input data, whether such input is performed by using a keypad integral with the device or by using a touchscreen either to mimic keypad operations through a virtual keypad or to respond to options presented to the user by the device. The device 100 may advantageously include a speaker 104 and microphone 108 in embodiments that additionally make use of acoustic signals as described below, but this is not a requirement of all embodiments and some embodiments implement the invention without the use of acoustic signals.

The structure of the terminal 140 of FIG. 1B is also intended to be exemplary. In this example, the terminal 140 comprises an optical terminal having an optical screen 144 with which image data may be read by the terminal 140, although other mechanisms of communication with the terminal 140 may be used in alternative embodiments. In the illustrated example, the terminal additionally includes a sound generator 148 that may be used in those embodiments that make use of acoustic signals.

Use of both a handheld electronic device 100 that incorporates input and output data interfaces advantageously allows the terminal 140 to be provided with a simplified structure that does not include such interfaces. Instead, embodiments of the invention exploit the user interfaces provided by the handheld electronic device in coordinating exchange of data between a user and the optical terminal 140, with additional communication being effected between the handheld device 100 and the terminal 140.

This is illustrated more fully in FIG. 1C for embodiments in which the terminal 140 comprises an optical terminal. Communication among the handheld device 100 and the terminal 140 may have direct and indirect components. Direct communication may be effected through the use of images 168 generated on a display comprised by the handheld device 100 that are presented to the optical screen 144 of the terminal 140. This advantageously ensures that the handheld device 100 is physically present at the terminal 140 at the time that the image is presented. Alternative communication mechanisms between the handheld device 100 and the terminal 140, such as the use of bluetooth connections, wifi connections, and the like, provide other forms of direct communication that may be used, but compromise the strength of ensuring the locality of the communication.

In the illustration, the image 168 generated by the handheld device 100 and read by the terminal 140 is shown as a two-dimensional barcode, although it will be understood by those of skill in the art that a variety of other types of images may be used in alternative embodiments, such as encrypted or unencrypted character strings. In embodiments that make use of two-dimensional barcodes, the invention is not limited by the symbology used in generating the barcode and may accommodate any symbology, including Aztec Code, Code 16K, PDF417, Compact PDF417, Micro PDF417, Macro PDF417, DataMaxtrix, QR Code, Semacode, and other formats. In addition, while the illustration of FIG. 1C shows a two-dimensional barcode, one-dimensional symbologies may be used in alternative embodiments, including Codabar, Code 11, Code 128, Code 32, Code 39, Code 93, EAN-13, EAN-8, EAN-99, EAN-Velocity, Industrial 2 of 5, Interleaved 2 of %, ISBN, UPC-A, UPC-E, and other symbologies. Furthermore, embodiments of the invention may accommodate both monochromatic and color barcode symbologies, including, for example, the High Capacity Color Barcode ("HCCB") symbology.

Local communication from the terminal 140 to the handheld device 100 may also be implemented using a variety of techniques, with the illustration showing the generation of a sound 172 by the terminal 140 that may be detected by a microphone comprised by the handheld device 100. Similar to the use of an image displayed on the handheld device 100 that is read by the terminal 140, generation of a sound imposes a strong requirement of locality between the terminal 140 and the device 100. In other embodiments, where such reverse communication is achieved using such protocols as bluetooth, wifi, or the like, the locality imposition may be weaker.

In addition to such direct forms of communication, indirect forms of communication may take place by using a network, illustrated in the drawing as the Internet 160, although any private or public network may be used in alternative embodiments. It is generally for many embodiments that the handheld device 100 will be provided in communication with the network, although a dashed line is indicated between the Internet 160 and the terminal 140 in the drawing to account for other embodiments in which the terminal 140 is also configured for communication with the Internet. Such indirect communications may be augmented by data provided by a web server 164 and permit a plurality of handheld devices 100 to be involved in the access-management functions described herein. Advantageously, such multiple-device interactions may use the direct communication techniques to impose a locality constraint only on one of the devices 100-1, with another of the devices 100-2 permissibly being remote from the terminal 140 so that it is accessed using only indirect communications.

Figure 2A:
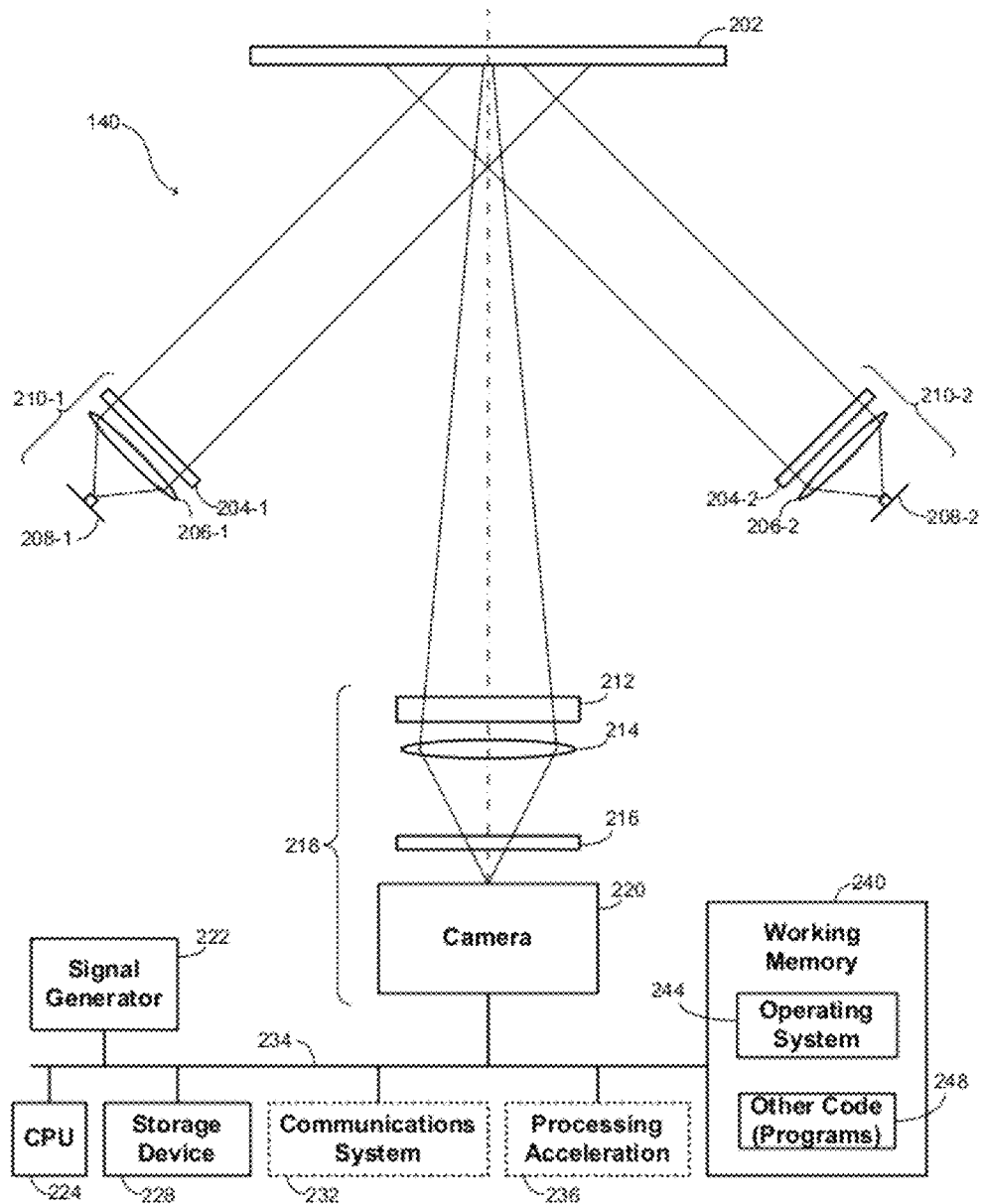
FIG. 2A is a schematic illustration of a structure of the optical terminal of FIG. 1B in an exemplary embodiment.

A detailed illustration of a terminal 140 is provided in FIG. 2A for a particular embodiment in which the terminal 140 comprises an optical terminal having structure that enables not only the reading of an image from handheld devices 100 but also enables the collection of biometric information from an individual. Terminals having such dual capability are referred to herein as "dual use" terminals. The biometric information collected in this illustration is collected from a skin site and at least some of the optical structure of the optical terminal is advantageously used in both image reading and biometric-data collection. But the invention is not limited to such a structure nor to such particular forms of biometric-data collection. Alternative embodiments will be evident to those of skill in the art that use alternative forms of biometric data collection, including devices that scan irises or retinas, perform facial- or hand-geometry measurements, and the like. Such alternative embodiments, even those in which collection of biometric data involves optical measurements, may or may not combine functionality of optical structure comprised by the device so that it is used in both biometric-data collection and in image reading from handheld devices.

Images are read through a platen 202 by a digital imaging system 218, which comprises a camera 220 and may additionally comprise optics that are discussed in detail below. Reading images from a handheld device may generally be performed without additional illumination by the terminal 140, such as by using backlight illumination provided by the handheld device itself, but illumination systems 210 may be provided as part of a mechanism for collecting biometric data. In the illustrated embodiment, the illumination systems 210 comprise light sources 208 and optics that interact with the optics of the digital imaging system 218. The arrangement shown in the drawing is especially suitable for collection of biometric data from skin sites placed in contact with the platen 202, but the optics of the illumination and imaging systems 208 and 218 may readily be adapted for collecting biometric data from skin sites that are not in contact with the platen 202. Appropriate skin sites for collection of biometric data include all surfaces and all joints of the fingers and thumbs, the fingernails and nail beds, the palms, the backs of the hands, the wrists and forearms, the face, the eyes, the ears, and all other external surfaces of the body. While the discussion below sometimes makes reference to "fingers," this is done for convenience and it should be understood that this refers merely to exemplary embodiments and that other embodiments may use skin sites at other body parts.

The number of illumination sources 208 may conveniently be selected to achieve certain levels of illumination, to meet packaging requirements, and to meet other structural constraints of the terminal 140. It also allows for a particular implementation of "multispectral" biometric imaging, which is used herein to refer to a more general class of optical data collection in which a set of images is collected under a plurality of distinct optical conditions during a single illumination session. Other implementations of multispectral biometric imaging are described further below in connection with particular optical structure that may be included in the terminal 140, including differences in polarization conditions, differences in imaging angles, differences in illumination wavelength, and the like.

In operation, illumination passes from the light sources 208 through illumination optics 206 that shape the illumination to a desired form, such as in the form of flood light, light lines, light points, and the like. The light sources 208 may be narrowband sources such as monochromatic LED's or laser diodes, or may be broadband sources such as white-light LED's or incandescent sources. In cases where the light sources 208 comprise a series of sources, the series of sources may be of the same wavelength or different wavelengths. The different sources 208 may be configured identically or they may differ from each other.

The illumination optics 206 are shown for convenience as consisting of a lens but may more generally include any combination of one or more lenses, one or more mirrors, and/or other optical elements. The illumination optics 206 may also comprise a scanner mechanism (not shown) to scan the illumination light in a specified one-dimensional or two-dimensional pattern. The light source 208 may comprise a point source, a line source, an area source, or may comprise a series of such sources in different embodiments.

After the light passes through the illumination optics 206, it passes through the platen 202 to illuminate the skin site so that reflected light is directed to the digital imaging system 218, which comprises detection optics 214 adapted to focus the light reflected from the skin site onto the array. For example, the detection optics 214 may comprise a lens, a mirror, a pinhole, or a combination of such optical elements or other optical elements known to those of skill in the art.

Both the illumination systems 210 and the digital imaging system 218 may additionally comprise optical polarizers 204 and 212. The polarizers 204 and 212 may be linear or circular, or a combination of the two. In the case of linear polarizers, one useful arrangement is that in which the illumination light is polarized along a particular axis while the detected light requires an orthogonal polarization. Such an arrangement has utility in ensuring that detected light has undergone multiple scatter events in a medium such as skin. Further utility is derived from the observation that such an arrangement greatly reduces the visibility of latent prints left on the platen 202 by previous users, thus providing improved image quality and reducing the likelihood of spoofing by "reactivating" the latent prints.

The digital imaging system 218 may also comprise a color filter array 216, which may in some instances be incorporated as part of the camera 220. The color filter array 216 may conveniently comprise a red-green-blue filter array in the well-known Bayer pattern or in other patters. In some instances, the filter elements may function to transmit wavelengths that differ from the standard red-green-blue wavelengths, may include additional wavelengths, and/or may be arranged in a pattern that differs from the Bayer pattern.

The terminal layout and components may advantageously be selected to minimize the direct reflection of the illumination into the digital imaging system 218. In one embodiment, such direct reflections are reduced by relatively orienting the illumination and detection optics such that the amount of directly reflected light detected is minimized. For instance, the optical axes of the illumination optics 210 and the detection optics 218 may be placed at angles such that a mirror placed on the platen 202 does not direct an appreciable amount of illumination light into the detection system 218. In addition, the optical axes of the illumination and detection optics may be placed at angles relative to the platen 202 such that the angular acceptance of both subsystems is less than the critical angle of the system; such a configuration avoids appreciable effects due to total internal reflectance between the platen 202 and the skin site.

The camera 220 may be coupled electronically with elements of a computational system that aid in processing of images collected by the terminal 140. In particular, hardware elements of such a computational system may be electrically coupled via bus 234, and may include a processor 224, a storage device 228, a processing acceleration unit 236 such as a DSP or special-purpose processor, and a memory 240. A communications system 232 may additionally be provided in those embodiments where the terminal 140 is equipped for communication with a network, but the structure of the terminal 140 is further simplified when communication with the terminal 140 takes place only through the optical interface. In embodiments that include a communications system 232, it may comprise a wired, wireless, modem, and/or other type of interfacing connection and permits data to be exchanged with the network 160 according to the structure illustrated in FIG. 1C.

Software elements are shown as being currently located within working memory 240, including an operating system 244 and other code 248, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 2C:
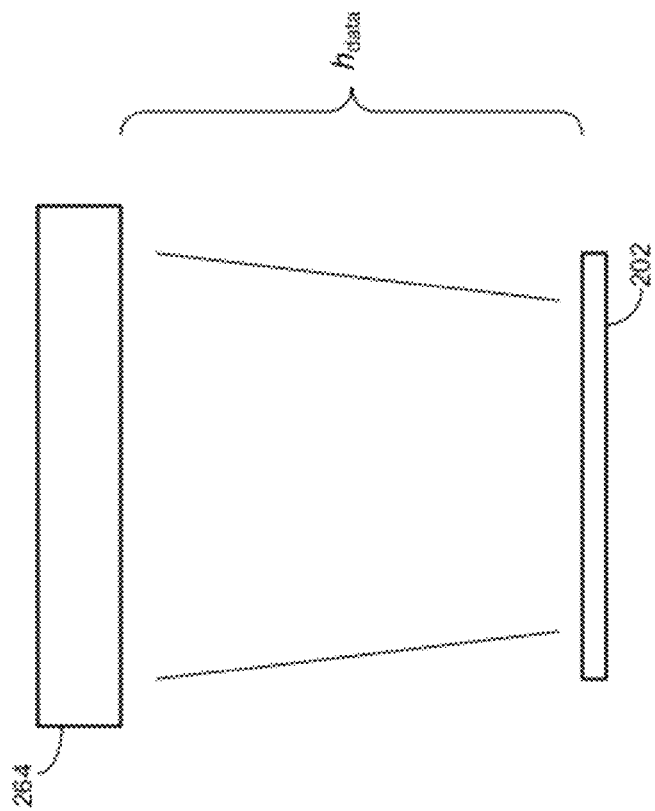
FIGS. 2B and 2C compare optical imaging characteristics for different functions of the optical terminal when the optical terminal is configured for dual-mode operation.
Figure 2B:
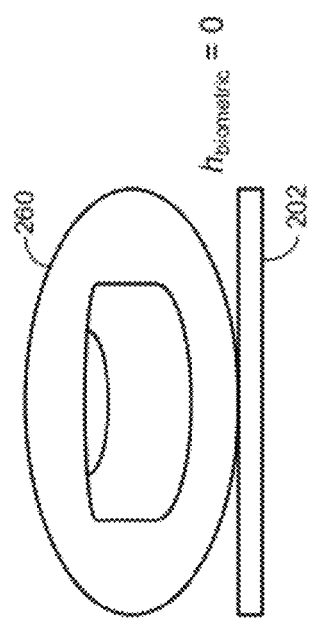

The structure of the terminal 140 thus described is suitable for imaging either a skin site or an image from a handheld device, as illustrated schematically in FIGS. 2B and 2C. In FIG. 2B, the skin site is shown as part of a finger 260 that is brought in contact with the platen 202, while FIG. 2C shows an illustration in which the handheld device 264 is held so that the display of the image on the handheld device is a height $h_{data}$ above the platen 202. Such a dual-mode terminal has a number of benefits, but it is to be understood that not all embodiments of the invention make use of such a dual-mode terminal, particularly embodiments in which no biometric functions are performed or embodiments in which the biometric and nonbiometric functionality is not integrated into a single terminal. Furthermore, while the described embodiment is suitable for multispectral applications, this is also not a requirement of the invention and many alternative embodiments use nonmultispectral configurations. Some examples of various alternative optical structures that may readily be adapted to the terminal are described in, for example, commonly assigned U.S. Pat. No. 7,460,696, entitled "MULTISPECTRAL IMAGING BIOMETRICS," the entire disclosure of which is incorporated herein by reference for all purposes.

Figure 3:
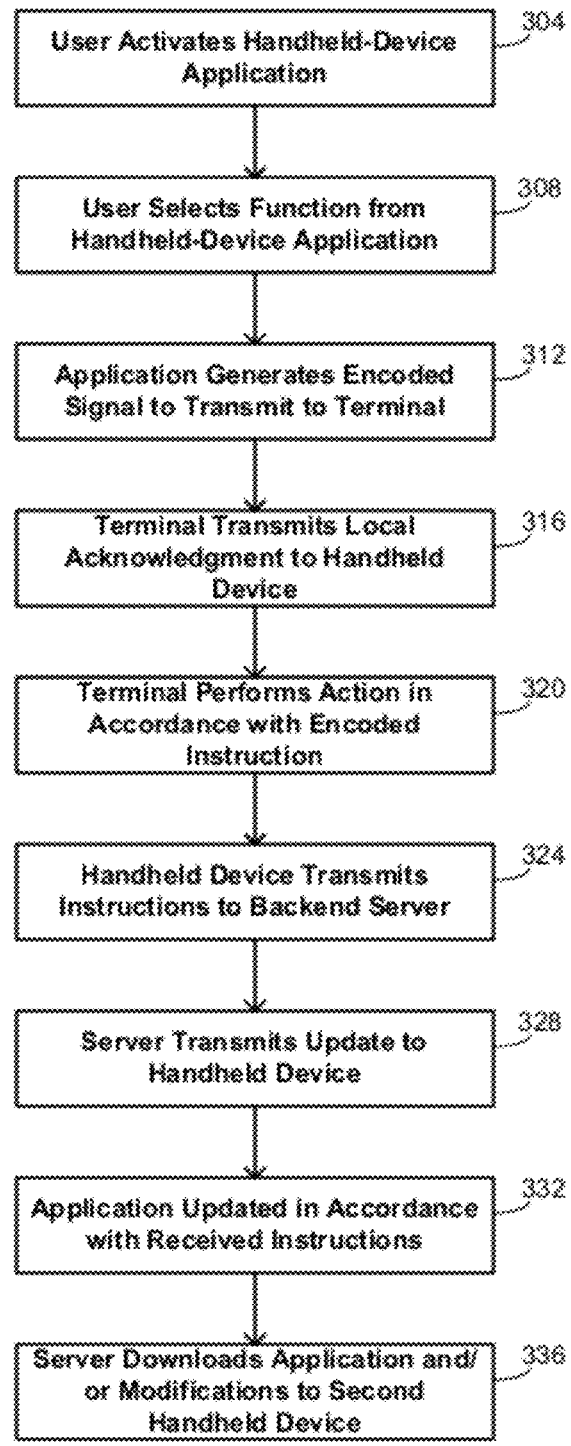
FIG. 3 is a flow diagram summarizing methods of managing access in accordance with embodiments of the invention.
Figure 4A:
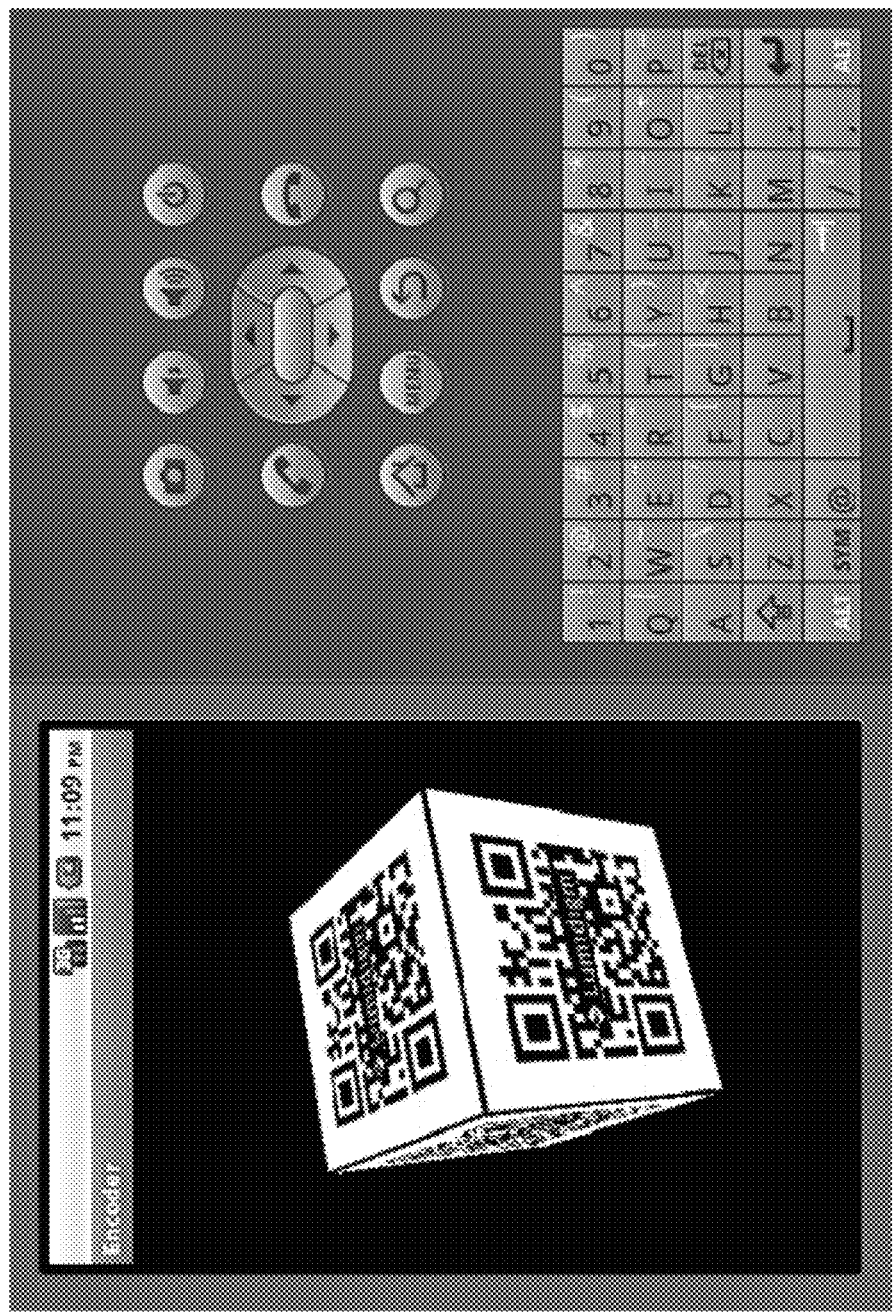
FIGS. 4A-4C provide examples of screen shots that may appear on handheld-devices used in embodiments of the invention.

An overview methods of the invention is summarized with the flow diagram of FIG. 3. While this and other flow diagrams in the application set forth an illustrative order of steps, this is not intended to be limiting. The steps identified specifically in the diagram may sometimes be performed in an alternative order, steps that are specifically identified may sometimes be omitted, and additional steps not specifically set forth may sometimes also be performed. In describing the methods of FIG. 3, reference is sometimes made to FIGS. 4A-4C, which provide examples of screen displays that may be presented on the handheld device in one implementation.

Figure 4B:
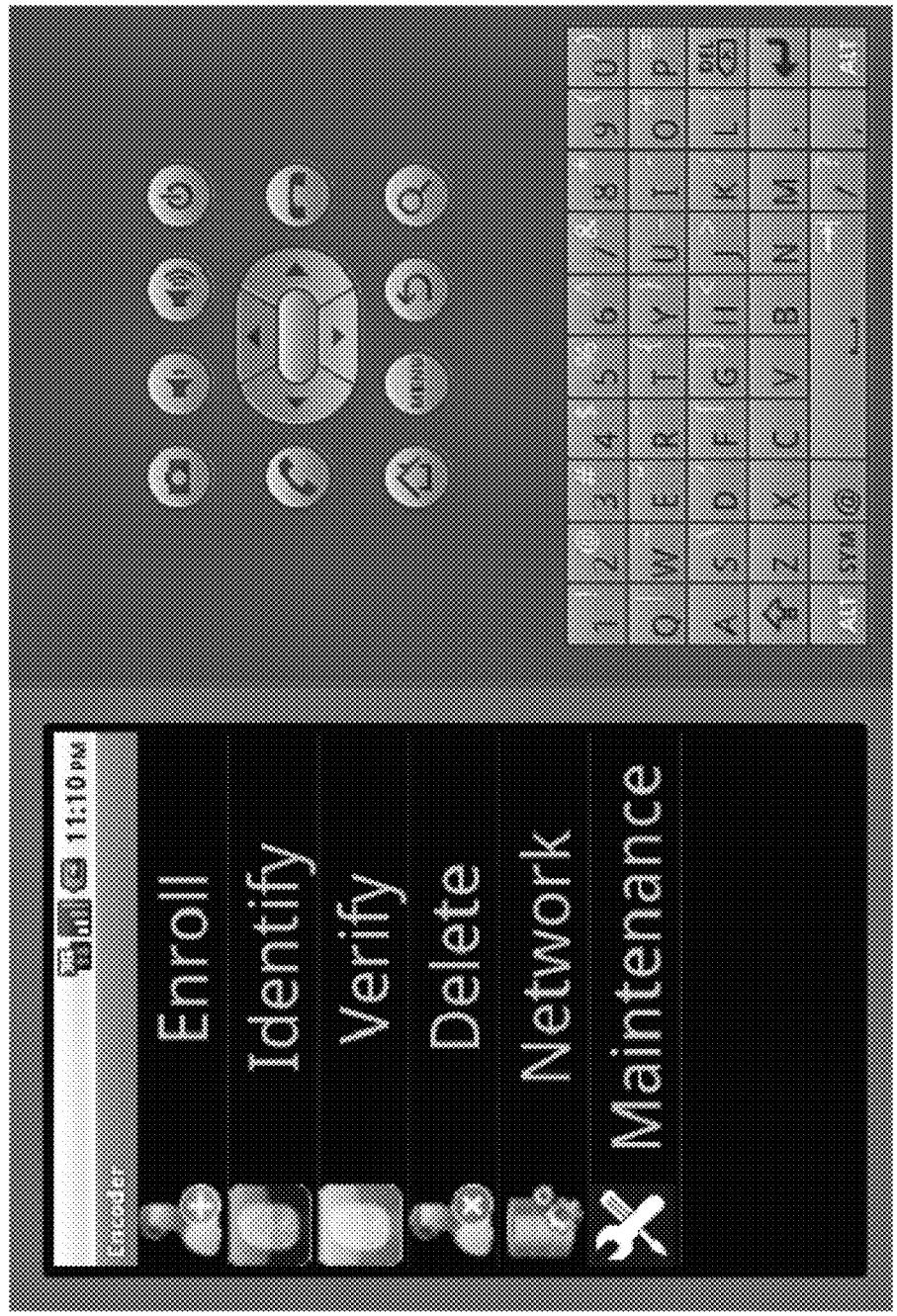
Figure 4C:

The methods illustrated with FIG. 3 permit a number of access-management functions to be performed with the handheld device and terminal of FIGS. 1A and 1B. Such methods begin at block 304 with a user activating an application maintained on the handheld device at block 304, with FIG. 4A providing an illustration of starting up such an application. FIG. 4B provides a screen display illustrating a number of access-management functions that may be selected at block 308 of FIG. 3; these examples are particularly suitable for embodiments that integrate biometric functionality. Selection of the function may prompt a request for entry of additional information. For example, selection of the "Enroll" function might prompt a request for entry of a user identification number ("userid") that may be entered using a virtual keypad like that shown in FIG. 4C.

Figure 5A:
FIGS. 5A-5C illustrate a pulsing barcode image that may be used in embodiments of the invention.
Figure 5B:
Figure 5C:
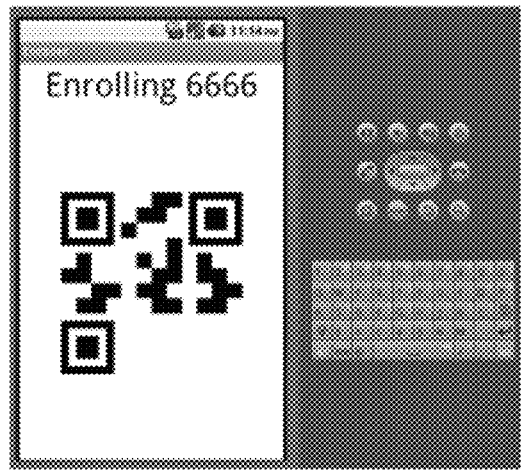

In response to selection of a function, the application generates an encoded signal to be transmitted from the handheld device to the terminal. In certain embodiments, the encoded signal comprises a barcode, which may advantageously be displayed on the handheld device as a pulsing barcode. In particular, the pulsing barcode changes its size in periodic fashion while maintaining substantially constant relative dimensions. This is illustrated for an example of a barcode in FIGS. 5A-5C. While the invention is not limited to any particular pulsation frequency, having a period between successive maximal sizes for the barcode on the order of a second provides certain benefits. In particular, the optics of the terminal may be configured to provide a certain depth of focus for imaging the barcode when the handheld device is held over the platen 202 as shown in FIG. 2C. Pulsing of the barcode allows greater variation in the acceptable distance $h_{data}$ that the handheld device may be presented to the platen 202 since the barcode size varies to accommodate the imaging optics. Within a wide range of distances $h_{data}$, the pulsing barcode will sweep multiple times through a size amenable to ready imaging by the terminal.

Figure 6A:
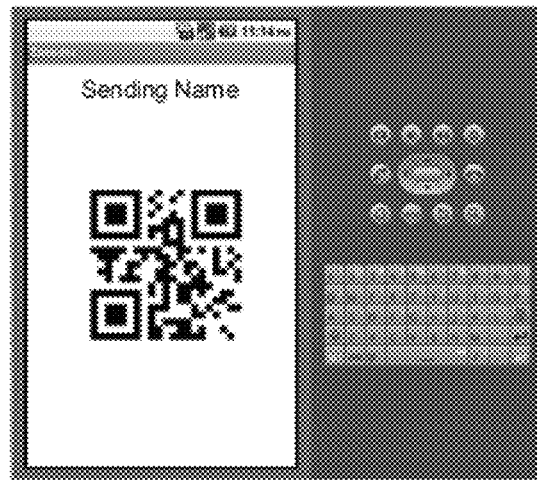
FIGS. 6A-6C illustrate a shifting barcode image that may be used in embodiments of the invention.
Figure 6B:
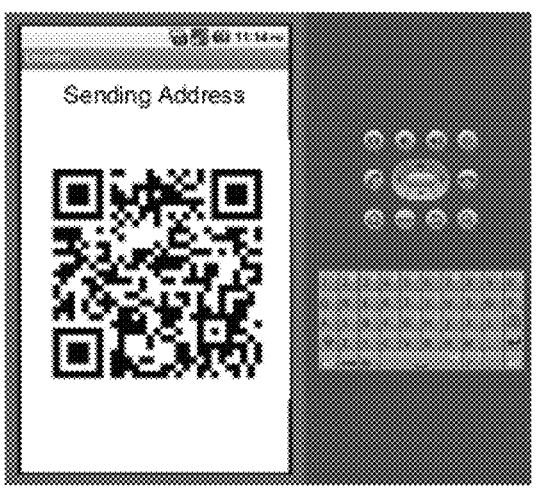
Figure 6C:

The content of the barcode itself may also change in time when presented on a display of a handheld device, as illustrated in FIGS. 6A-6C. The time variation of the barcode effectively adds a further dimension to the barcode, resulting in a concomitant increase in the amount of information that may be conveyed from the handheld device to the terminal. For instance, a time-varying two-dimensional barcode is equivalent to a rendering of a three-dimensional barcode, with the successive two-dimensional barcode images corresponding to two-dimensional slices of the three-dimensional barcode. The concept applies also to other types of barcodes. A time-varying one-dimensional barcode is equivalent to a further symbology of a two-dimensional barcode, with the successive one-dimensional barcodes corresponding to one-dimensional slices of the two-dimensional barcode. Similarly, when a barcode uses color, such as in the case of the HCCB symbology, the time variation effectively provides a fourth dimension: the two spatial dimensions of the barcode itself, a third dimension that corresponds to the color representations, and a fourth dimension that corresponds to the time variation.

Depending on the specific embodiment, then, the amount of information conveyed by the encoded signal at block 312 of FIG. 3 may be very great. At block 316, the terminal may transmit a local acknowledgment to the handheld device after it has successfully imaged and decoded the signal. With the structures shown in FIGS. 1A and 1B, such a local acknowledgment may take the form of a sound generated by the terminal, but other types of acknowledgments may be transmitted in alternative embodiments, including electromagnetic acknowledgments that use visible or nonvisible light as well as sounds that are outside the range of human hearing. For instance, a radio-frequency ("rf") signal could alternatively be generated for transmission of the acknowledgment from the terminal to the hand-held device.

There are a number of different responses that may be made to receipt of the acknowledgment by the handheld device, a principal one being to instruct the application to cease presentation of the barcode or other encoded signal. As previously noted, the use of a local acknowledgment in this way also acts to ensure that the handheld device that generated the barcode is local to the terminal. This is one of a number of security protections that may be implemented.

Another security feature that may be implemented is to restrict the form of encoding in time. For example, the encoding coordinated between the handheld device and the terminal may be such that particular encoded patterns are used only a single time, similar to the use of one-time-pad encryption systems, with the encoded patterns being valid only for a window of time on the order of minutes. Rather than encode a plaintext instruction such as "Enroll user John Smith" into a two-dimensional barcode pattern, there may be a further level of encryption so that "Enroll user John Smith" is first encrypted using a one-time key with the encrypted string being encoded into the two-dimensional barcode pattern. Such techniques may rely on a number of sources for the one-time key, such as by having the application on the handheld device and the terminal use their interfaces with the network 160 to access a common source of information to provide the one-time key. Any techniques in which the validity of an encoded pattern is limited in time generally requires some reasonable close time synchronization of the handheld device and the terminal.

Once the terminal has properly received and decoded the signal from the handheld device, it may initiate the access maintenance functions, as indicated at block 320. This may include any of a variety of functions, such as enrolling a user for access according to certain access-level criteria, identifying a previously enrolled person, verifying the identity of a previously enrolled person, removing access for a previously enrolled user, redefining access levels for a previously enrolled user, and the like. Some of these functions are described in greater detail below to illustrate how such functions may be specifically implemented.

At block 324 of FIG. 3, the handheld device transmits instructions to a backend server over the network 160 and the server transmits an update to the handheld device that generated the encoded pattern at block 328, allowing updates to be made to the application in accordance with the received instructions at block 332. This exchange of information between the handheld device and the server may be prompted by detection of the acknowledgment signal transmitted from the terminal 140 at block 316. In this way, the terminal 140 acts as an isolated component that is involved in communications among system components only through its optical interface and responsive signal. In alternative embodiments in which the terminal 140 is provided with a communications system as illustrated in FIG. 2A, the instructions may instead be transmitted directly from the terminal 140 to the server over the network. In addition, the server may download an application and/or modifications to an existing application to a second handheld device at block 336, which may or may not be local to terminal.

EXAMPLES

The general operation of the system described in connection with FIG. 3 may be better understood with examples of specific functions. These examples are provided only by way of illustration, it being understood that the systems and methods of the invention are amenable to numerous further functions.

Enrollment

Figure 7:
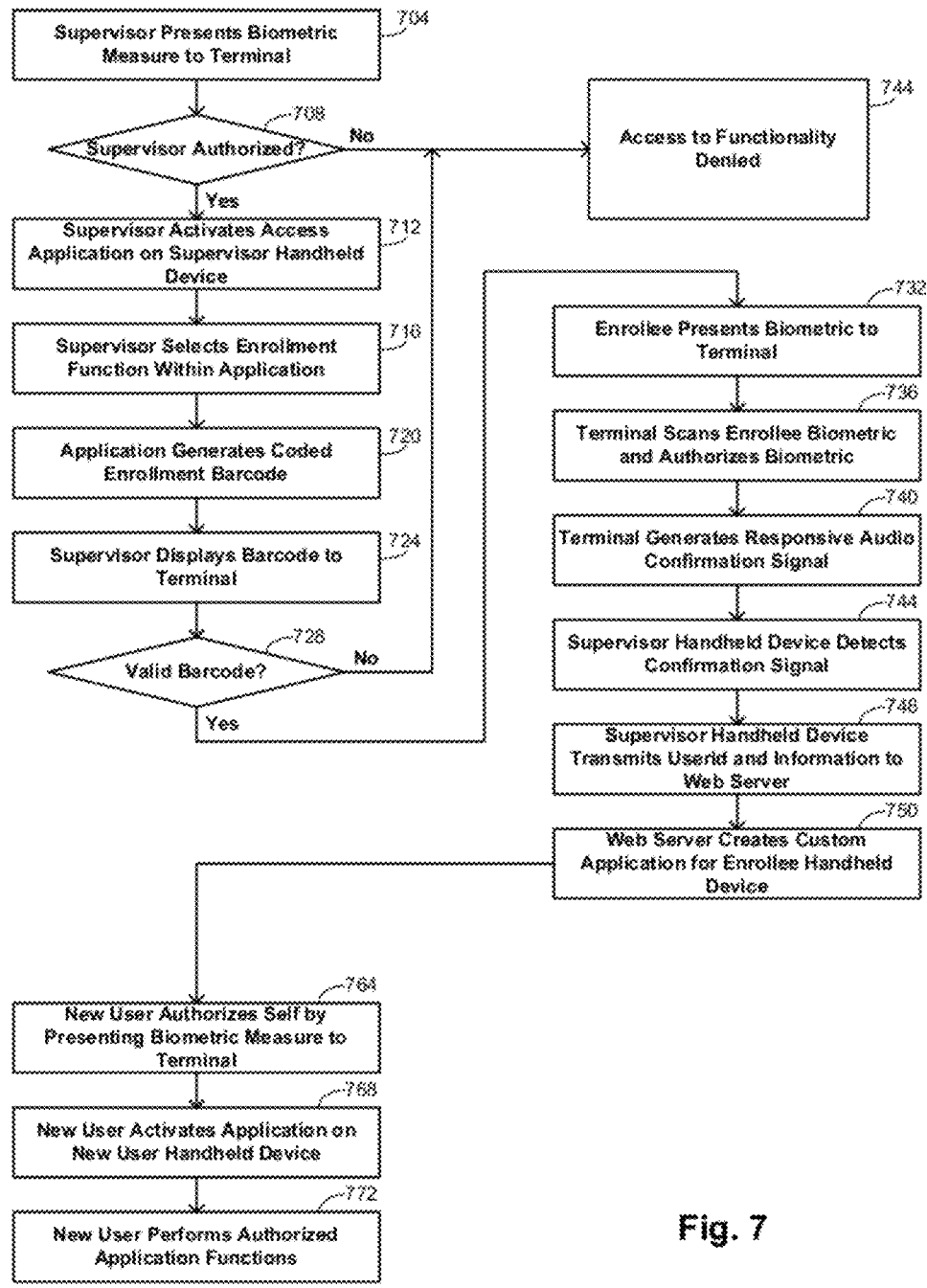
FIG. 7 is a flow diagram illustrating in detail how enrollment functions may be implemented in managing access.

Methods of using the system described above to enroll an individual are illustrated with the flow diagram of FIG. 7. In this example, enrollment of a user who has a handheld device is effected by a supervisor who also has a handheld device. The supervisor has previously been enrolled with the system such that her biometric is registered with the system. Enrollment of the user begins at block 704 with the supervisor presenting her biometric measure to the terminal, such as by placing her finger on the platen so that her fingerprint may be imaged in either a conventional manner or by using multispectral imaging if the terminal is equipped for multispectral imaging. If the supervisor can be authenticated by the terminal as indicated at block 708, she may continue with enrollment functions, but will otherwise be denied access to functionality of the terminal at block 744.

At block 712, the supervisor activates the application on her handheld device, selecting the enrollment function at block 716. As part of selecting the enrollment function, the supervisor is prompted by the application to enter a userid for the individual to be enrolled and perhaps to enter other information such as an access level for the individual, communication information for the individual such as telephone number and email address, and the like. The application generates an enrollment barcode at block 720 from that information using any of the techniques described above, i.e. by generating a one-dimensional or two-dimensional barcode that pulses on the handheld device and that may vary in time or may use color and that is encoded from plaintext or that undergoes a prior encryption, perhaps by using a time-restricted encryption key.

After displaying the supervisor displays the barcode to the terminal at block 724 so that it may be imaged, the terminal verifies that it is valid at block 728, again denying access to the desired functionality at block 744 if the barcode is invalid. The new user presents his biometric to the terminal, such as by placing his finger on the terminal platen, at block 732. In some embodiments, multiple measurements of the user's biometric may be taken, both to ensure an accurate reading of the biometric and as a spoof-prevention protocol. After the terminal has scanned the new user's biometric at block 736 and updated internal records on the storage device to reflect the user's authorization, including his authorization level, the terminal generates a responsive audio signal at block 740 that is detected by the handheld device at block 744, confirming the locality of the interaction and prompting the handheld device to cease pulsation of the barcode and to transmit the userid and related information for the new user to the server at block 748.

A custom application is created by the web server, appropriate to the user's authorization level, at block 750 and downloaded directly to the new user's handheld device. Customization of the application my reflect such unique characteristics as the new user's personal information and its specific functionality may depend on the authorization level granted. For instance, a low-level authorization might provide only limited access to certain physical areas or functionality while an intermediate-level authorization provides access to a greater number of physical areas or functionality. A highest-level authorization might provide the capability for the new user to act as a supervisor himself so that the custom application includes functionality for enrolling other users rather than only providing the limited functionality of lower-level authorizations.

With the enrollment of the new user complete, he is then able to authorize himself by presentation of his biometric measure to the terminal at block 764, to activate the application on his own handheld device at block 768, and the to perform those functions for which he is authorized at block 772.

Access Management

Figure 8:
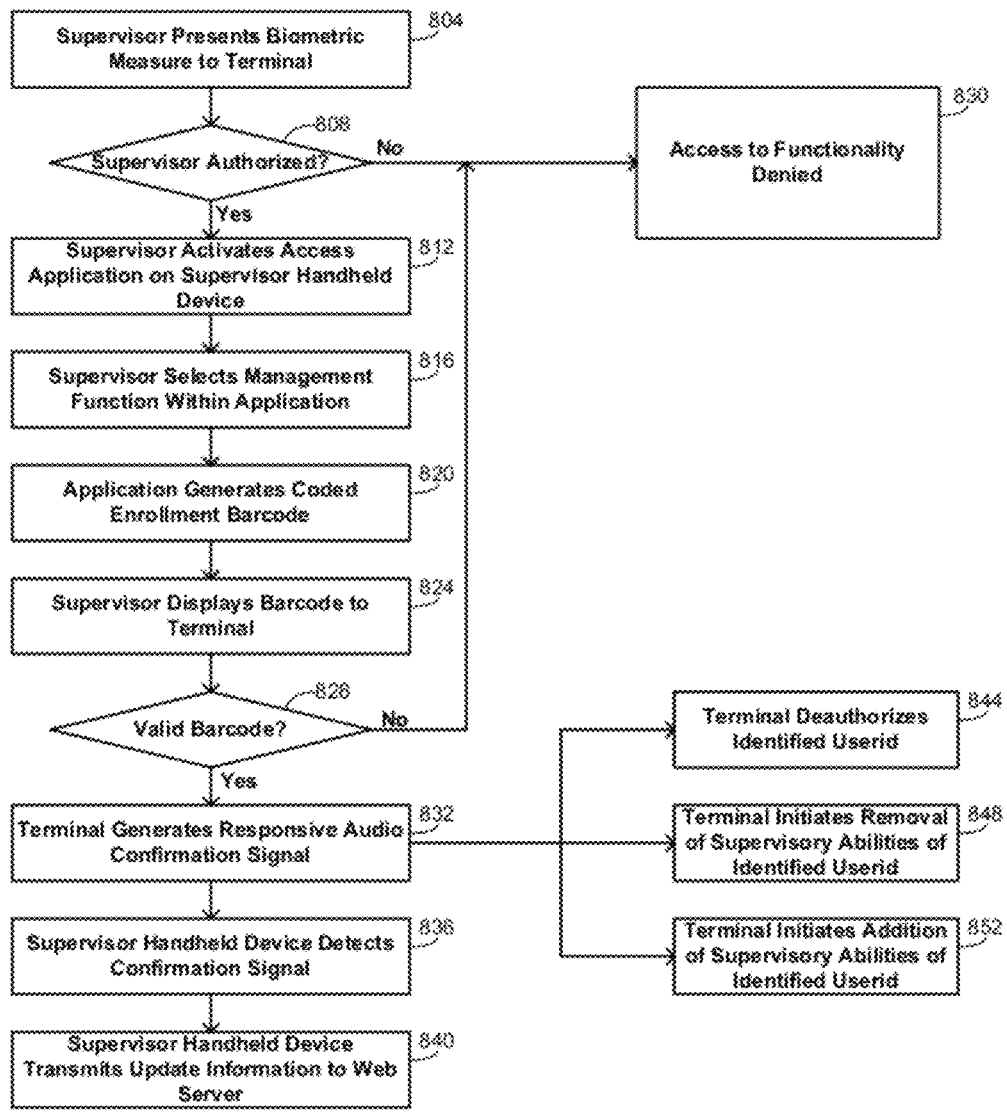
FIG. 8 is a flow diagram illustrating other supervisory access-management functions as they may be implemented in embodiments of the invention.

Supervisors may be provided with the capability to de-enroll users at authorization levels below theirs or to modify their access levels. This is illustrated with the flow diagram of FIG. 8, with the method beginning when the supervisor presents her biometric measure to the terminal at block 804 so that it can be verified at block 808 and access to functionality enabled. If an unauthorized individual attempts to gain access to the functionality and accordingly fails the biometric check at block 808, that access is denied at block 830.

Similar to the enrollment function, the supervisor activates the application on her handheld device at block 812 and selects an access management function at block 816, either entering the userid of the user whose access levels are to be modified or selecting the userid from a generated menu of userids. The application may also prompt the supervisor to select what type of access-management changes are to be made, examples of which include completely deauthorizing the user, changing the access level of the user to a higher or lower level, or removing or adding supervisory capability. After receiving the appropriate information from the supervisor, the application generates a barcode at block 820 that includes instructions to give effect to the desired access changes, and the supervisor displays the barcode to the terminal at block 824.

After a check that the barcode is valid at block 828, the terminal generates a responsive audio signal at block 832 and takes appropriate action at block 844, 848, or 852 to change the access level of the identified user. The handheld device detects the confirmation signal at block 836, causing it to cease display of the barcode and to initiate transmittal of update information to the web server at block 840 as described above.

Service-Level Modification

Figure 9:
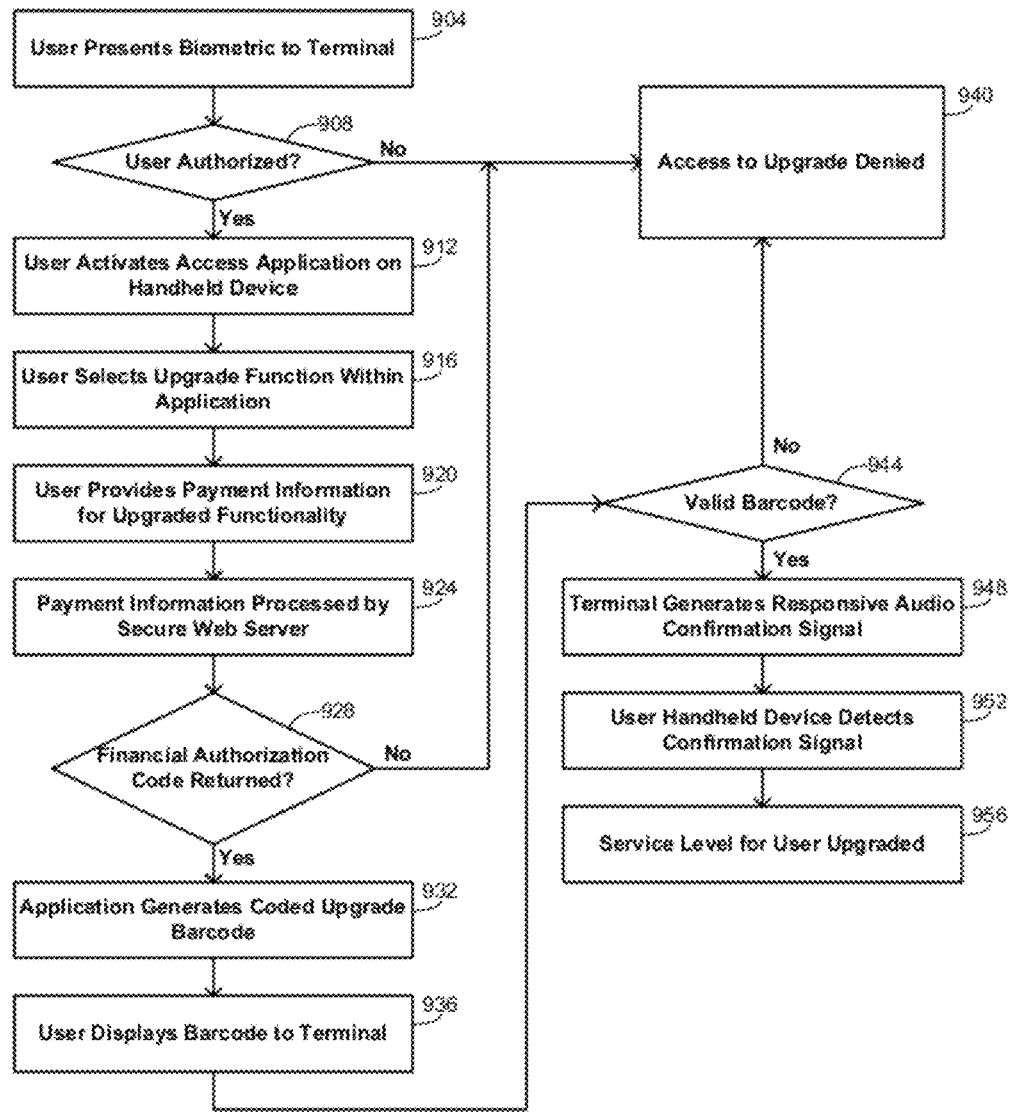
FIG. 9 is a flow diagram illustrating methods of managing service levels to access management in certain embodiments.

In some embodiments, the terminal may be made available to customers as part of a service in providing a mechanism for access control. The level of service may depend on the amount that is paid for the service and may be limited by such factors as the number of people who may be enrolled to have access, the number of people enrolled at particular access levels, the length of time the service will be provided, and the like. The system may advantageously be configured to allow automatic modifications in service levels as illustrated in FIG. 9.

Consider a customer having purchased services at a particular service level who wishes to modify the service level. A user, such as an employee or officer of the customer, engages in an authentication process by presenting his biometric measure to the terminal at block 904 so that it may be checked and block 908, with access denied at block 940 if appropriate. To begin the service upgrade or downgrade, the user activates the handheld-device application at block 912 and selects the service modification function at block 916.

The desired change in service level may be determined in any of several mechanisms, one of which is to have the handheld device present the user with an identification of the current service level, specifying such features of the service as number of allowable users at each level, time restrictions and the like, together with a listing of different available service levels and their cost. When the desired service level has been selected, the user additionally provides payment information at block 920 that is processed by a secure web server using the network communication capabilities of the handheld device at block 924. This may be done using any of a variety of known financial-transaction techniques known to those of skill in the art.

A check is made at block 928 whether the financial aspect of the transaction has been approved by checking for the return of a valid financial authorization code. If no valid authorization code is returned, the upgrade is denied at block 940.

Upon receipt of a valid authorization code indicating that the payment information has been successfully processed, the application on the handheld device generates a barcode at block 932 that encodes instructions defining the authorized change in service level. As before, the barcode may take any of a variety of forms, including being a pulsing barcode, having a time variation, including color, and the like. The process for completing the modification is then similar to what has been described above, namely that the user displays the barcode to the terminal at block 936 so that it may be evaluated at block 944. Upon confirmation that the barcode is valid, the terminal generates a responsive confirmation signal at block 948, the handheld device detects the signal at block 952, and the service level for the user is upgraded at block 956 through an exchange of information between the handheld device and the web server.

Implementations

There are a large number of environments in which the systems and methods described above may be implemented. The illustrations provided below are intended only to provide an example of the breadth of such implementations, recognizing that many other implementations are within the scope of the invention.

One implementation for the systems and methods described above is a large factory environment in which different employees have access to different physical parts of the factory. When used in this environment, terminals may be deployed at various access points, requiring authorized employees to present biometric measures to gain access, and with the terminals additionally being capable of performing any of the access-management functions described herein. Those functions enable effective management of a potentially large number of employees, with greater security for controlling access than in other arrangements.

Another implementation for the systems and methods described above is a small office environment in which different employees are all to be provided physical access to the office but whose access to certain equipment is limited. For instance, access to human-resources computers might be limited to those in that department. When used in this environment, a terminal may be deployed at the entrance to the office where it is used by all employees to gain access to the office.

Terminals may also be deployed to limit access to sensitive equipment to those who have a sufficient access level. The service-update features are particularly suitable in such implementations to manage access levels as employees within the office are hired, dismissed, or promoted.

In another implementation, a terminal may be deployed in an automobile or other vehicle so that access to the vehicle is controlled by biometric recognition of those authorized to drive the vehicle. The access-management functions are particularly useful in such implementations when the vehicle is entrusted to others on a temporary basis, such as when the vehicle is entrusted to a valet or when the vehicle is left at a shop for repairs. Temporary authorizations commensurate with the temporary nature of the entrustment may then be provided.

In a further implementation, a terminal may be deployed in a classroom setting in which information is gathered by applications on each of the handheld devices by students, such as in a scenario in which answers to exam questions are provided to the applications. At the conclusion of the exam, the barcode that is generated encodes each student's answers to the questions, which are delivered to the terminal. Academic misconduct issues may be addressed by additionally requiring biometric verification of student identities when they present their handheld devices to the terminal and by ensuring that the application will not terminate until the confirmation signal is received from the terminal so that the student handheld devices cannot be used to access other applications for answers.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A biometric terminal comprising:
    a biometric reader;
    an input device; and
    a processor in communication with the biometric reader and the input device, the processor having:
        instructions to read a biometric measure from a user with the biometric reader;
        instructions to receive, via the input device, an encoded signal generated by an application on a handheld device, the encoded signal including an instruction comprising user update information to update access to a biometric access system;
        instructions to decode the encoded signal;
        instructions to determine whether to authorize the user according to the biometric measure;
        instructions to modify biometric access to the biometric access system in accordance with the instruction to update access to the biometric access system when the user is authorized according to the biometric measure; and
        instructions to acknowledge the biometric access system has been updated.

2. The biometric terminal recited in claim 1 wherein the user update information comprises enrollment of the user into the biometric access system.

3. The biometric terminal recited in claim 1 wherein the user update information comprises deletion of authorization for the user from the biometric access system.

4. The biometric terminal recited in claim 1 wherein the user update information comprises changing an access level for the user within the biometric access system.

5. The biometric terminal recited in claim 1 wherein:
    the user update information comprises a change in service level with the biometric access system, wherein the change in service level comprises a change in the number of users permitted to be authorized by the biometric access system or a change in a time period over which access is permitted to be authorized by the biometric access system; and
    the processor further has:
    instructions for transmitting a request for payment from the handheld device to a payment processor over the network; and
    instructions for receiving an approval from the payment processor over the network before generating the encoded signal.

6. The biometric terminal recited in claim 1 wherein:
    the input device consists of an optical reader; and
    the encoded signal comprises an image displayed on a display of the handheld device and readable by the optical reader.

7. The biometric terminal recited in claim 6 wherein the image having a size that is periodically modulated on the display while maintaining internal relative dimensions within the image.

8. The biometric terminal recited in claim 6 wherein:
    the image changes over time; and
    the instructions to receive the encoded signal comprise instructions to read a plurality of images from the display.

9. The biometric terminal recited in claim 6 wherein the image comprises a barcode.

10. The biometric terminal recited in claim 9 wherein the barcode comprises a two-dimensional barcode.

11. The biometric terminal recited in claim 9 wherein the barcode comprises a color barcode.

12. The biometric terminal recited in claim 1 wherein the biometric reader comprises an optical biometric reader configured to image a skin site of the user.

13. The biometric terminal recited in claim 12 wherein the optical biometric reader comprises:
    an illumination source disposed to provide light to illuminate the skin site; and
    an imaging system disposed to receive light scattered from the skin site.

14. The biometric terminal recited in claim 13 wherein the optical biometric reader comprises optics to generate multispectral images detected by the imaging system.

15. The biometric terminal recited in claim 13 wherein the input device consists of the optical biometric reader.

16. The biometric terminal recited in claim 1 further comprising a signal generator in communication with the processor, wherein the instructions to acknowledge comprise instructions to generate an acknowledgment signal with the signal generator to the handheld device after the biometric access system has been updated.

17. The biometric terminal recited in claim 1 wherein the signal generator comprises an acoustic signal generator.

18. The biometric terminal recited in claim 1 wherein the user update information comprises enrollment of an individual other than the user into the biometric access system.

19. The biometric terminal recited in claim 1 wherein the user update information comprises deletion of authorization for an individual other than the user from the biometric access system.

20. The biometric terminal recited in claim 1 wherein the user update information comprises changing an access level for an individual other than the user within the biometric access system.

21. A biometric terminal comprising:
   an input device consisting of an optical reader;
   a signal generator; and
   a processor coupled with the optical reader and the signal generator, the processor having:
      instructions to read a biometric measure from a skin site of a user with the optical reader;
      instructions to receive, via the optical reader, an encoded signal generated by an application on a handheld device, the encoded signal comprising an image displayed on a display of the handheld device, wherein the image includes instructions comprising user update information to update a biometric access system;
      instructions to decode the encoded signal;
      instructions to update the biometric access system in accordance with the instruction to update the biometric access system and the biometric measure; and
      instructions to transmit an acknowledgment signal with the signal generator to the handheld device after the encoded signal has been decoded.

22. The biometric terminal recited in claim 21 wherein the image has a size that is periodically modulated on the display while maintaining internal relative dimensions within the image.

23. The biometric terminal recited in claim 21 wherein:
   the image changes over time; and
   the instructions to receive the encoded signal comprise instructions to read a plurality of images from the display.

24. The biometric terminal recited in claim 21 wherein the image comprises a barcode.

25. The biometric terminal recited in claim 24 wherein the barcode comprises a two-dimensional barcode.

26. The biometric terminal recited in claim 24 wherein the barcode comprises a color barcode.

27. The biometric terminal recited in claim 21 wherein the signal generator comprises an acoustic signal generator.

28. The biometric terminal recited in claim 21 wherein the optical reader comprises:
   an illumination source disposed to provide light to illuminate the skin site of the user; and
   an imaging system disposed to receive light scattered from the skin site or from the display of the handheld device.

29. The biometric terminal recited in claim 28 wherein the optical reader comprises optics to generate multispectral images detected by the imaging system.

* * * * *